United States Patent
Kreisler Rambow (10) Patent No.: US 8,380,021 B2
(45) Date of Patent: Feb. 19, 2013

(54) HIGH SPATIAL RESOLUTION DISTRIBUTED TEMPERATURE SENSING SYSTEM

(75) Inventor: Frederick Henry Kreisler Rambow, Houston, TX (US)

(73) Assignee: Shell Oil Company, Houston, TX (US)

( * ) Notice: Subject to any disclaimer, the term of this patent is extended or adjusted under 35 U.S.C. 154(b) by 274 days.

(21) Appl. No.: 12/676,368

(22) PCT Filed: Sep. 4, 2008

(86) PCT No.: PCT/US2008/075187
§ 371 (c)(1),
(2), (4) Date: May 24, 2010

(87) PCT Pub. No.: WO2009/032881
PCT Pub. Date: Mar. 12, 2009

(65) Prior Publication Data
US 2010/0254650 A1    Oct. 7, 2010

Related U.S. Application Data (60) Provisional application No. 60/970,399, filed on Sep. 6, 2007.

(51) Int. Cl.
*G02B 6/00* (2006.01)
*G02B 6/34* (2006.01)
(52) U.S. Cl. ............... 385/13; 385/12; 385/31; 385/37; 73/152.51; 73/152.52
(58) Field of Classification Search .............. 385/12, 385/13, 37; 73/152.52
See application file for complete search history.

(56) References Cited

U.S. PATENT DOCUMENTS

| | | | |
|---|---|---|---|
| 5,798,521 A | 8/1998 | Froggatt | 250/227.19 |
| 6,233,374 B1 * | 5/2001 | Ogle et al. | 385/13 |
| 6,252,656 B1 | 6/2001 | Wu et al. | 356/73.1 |
| 6,346,702 B1 | 2/2002 | Davis et al. | 250/227.14 |
| 6,354,147 B1 | 3/2002 | Gysling et al. | 73/61.79 |
| 6,358,618 B1 * | 3/2002 | Grossman | 428/472 |
| 6,363,089 B1 | 3/2002 | Fernald et al. | 372/20 |
| 6,426,496 B1 | 7/2002 | Froggatt et al. | 250/227.18 |
| 6,450,037 B1 | 9/2002 | McGuinn et al. | 73/705 |
| 6,854,327 B2 | 2/2005 | Rambow et al. | 73/250 |
| 6,882,595 B2 * | 4/2005 | Woo | 367/149 |
| 7,113,091 B2 | 9/2006 | Script et al. | 340/546 |
| 7,245,791 B2 | 7/2007 | Rambow et al. | 385/12 |
| 7,302,139 B1 * | 11/2007 | Ames | 385/37 |
| 7,471,860 B2 | 12/2008 | Coronado et al. | 385/100 |
| 2006/0233482 A1 | 10/2006 | Rambow | 385/12 |
| 2007/0258674 A1 * | 11/2007 | Wang et al. | 385/13 |
| 2008/0181555 A1 | 7/2008 | Head | 385/13 |

FOREIGN PATENT DOCUMENTS
DE        19913113       10/2000

* cited by examiner

*Primary Examiner* — Ryan Lepisto (57) ABSTRACT

A system for making temperature and pressure measurements distributed over a distance comprises a plurality of Bragg grating measurement points disposed in an optical fiber with a predetermined spacing between adjacent Bragg grating measurement points and a substrate with the optical fiber disposed thereon, at least a portion of the optical fiber being wrapped around the substrate with at least one predetermined wrap angle, wherein the predetermined wrap angle and predetermined spacing are selected to enable a temperature measurement signal to be distinguished from a bending measurement signal, wherein the substrate has a first coefficient of thermal expansion greater than a second coefficient of thermal expansion of the optical fiber and wherein the substrate comprises a hollow tube portion and a solid rod portion, each having optical fiber disposed thereon.

20 Claims, 10 Drawing Sheets

| | A | B | C | D | E | F | G | H | I | J | K | L |
|---|---|---|---|---|---|---|---|---|---|---|---|---|
| 1 | | | | | | | | | | | | |
| 2 | | 12.00136075 | 11.99725 | | 0.875 | | | | | | | |
| 3 | 500 | Length of one wrap around casing (ft) | Height of one wrap around casing (ft) | Radius of curvature of helix (in) | Length of measuring fiber (ft) | Length of tubular (ft) measured | ~# of gratings per turn | ~total # of gratings | Tubular Diameter in inches | Number of wraps (turns) | Grating Spacing cm | Pipe Joint Length (ft) |
| 4 | 88.5 | 1.000113396 | 0.999771 | 72.9678 | 1.000113 | 0.999771 | 30.48346 | 30.48346 | 0.1 | 1 | 1 | 36.6 |
| 76 | 70 | 0.076544956 | 0.076545 | 0.427431 | 0.076545 | 0.071929 | 2.33309 | 2.33309 | 0.939693 | 508.8370121 | | |
| 77 | 71 | 0.080413014 | 0.076032 | 0.471721 | 0.080413 | 0.076032 | 2.450989 | 2.450989 | 0.945519 | 481.3762705 | | |
| 78 | 72 | 0.084471999 | 0.080573 | 0.523606 | 0.08472 | 0.080573 | 2.582265 | 2.582265 | 0.951057 | 454.2436492 | | |
| 79 | 73 | 0.089543264 | 0.085631 | 0.584923 | 0.089543 | 0.085631 | 2.729279 | 2.729279 | 0.956305 | 427.4170573 | | |
| 80 | 74 | 0.094979567 | 0.0913 | 0.658102 | 0.09498 | 0.0913 | 2.894977 | 2.894977 | 0.961262 | 400.8752683 | | |
| 81 | 75 | 0.101151431 | 0.097705 | 0.746409 | 0.101151 | 0.097705 | 3.083096 | 3.083096 | 0.965926 | 374.597848 | | |
| 82 | 76 | 0.1082164 | 0.105002 | 0.854317 | 0.108216 | 0.105002 | 3.298436 | 3.298436 | 0.970296 | 348.565086 | | |
| 83 | 77 | 0.116380502 | 0.113398 | 0.988083 | 0.116381 | 0.113398 | 3.547278 | 3.547278 | 0.97437 | 322.7579332 | | |
| 84 | 78 | 0.125918444 | 0.123167 | 1.156675 | 0.125918 | 0.123167 | 3.837994 | 3.837994 | 0.978148 | 297.157942 | | |
| 85 | 79 | 0.137204835 | 0.134684 | 1.37332 | 0.137205 | 0.134684 | 4.182003 | 4.182003 | 0.981627 | 271.7472101 | | |
| 86 | 80 | 0.150764131 | 0.148474 | 1.658169 | 0.150764 | 0.148474 | 4.595291 | 4.595291 | 0.984808 | 246.5083284 | | |

HIGH SPATIAL RESOLUTION DISTRIBUTED TEMPERATURE SENSING SYSTEM

PRIORITY CLAIM

The present application claims priority from PCT/US2008/075187. filed 4 Sep. 2008. which claims priority from US Provisional Application 60/970,399 filed 6 Sep. 2007.

TECHNICAL FIELD OF THE INVENTION

The present disclosure relates generally to a system and a method for making temperature measurements distributed over a distance. The present disclosure further relates to a method for producing a mineral hydrocarbon fluid.

BACKGROUND OF THE PRESENT DISCLOSURE

U.S. Pat. No. 7,245,791, describes methods for determining a preferred application of a plurality of transducers and/or sensors to a cylindrical structure for monitoring deformation of the structure as the structure is subjected to various forces and is also directed to methods for imaging deformation of an object as the object is subjected to various forces. U.S. Pat. No. 7,245,791 also discloses that it is well known that temperature variations may impart additional strain to an optical fiber, to transducers disposed therein, and to a structure, such as a well tubular and/or casing, about which the optical fiber is wrapped, and that these temperature variations affect the index of refraction in the optical fiber, so that temperature variations may be considered independently for calibrating the strain measurements. U.S. Pat. No. 7,245,791 further discloses that this can be done either by a separate temperature measurement that could be performed by mechanically decoupling short lengths of the bare optical fiber from the structure or by using a separate but similar bare optical fiber that is entirely decoupled mechanically from the structure, for example, to measure the temperature in the vicinity of the structure undergoing the strain measurement.

However, it has been discovered that measuring the strain imparted to short lengths of a bare optical fiber mechanically decoupled from a structure to measure temperature variations does not provide sufficient temperature sensitivity. Similarly, measuring the strain imparted to a bare optical fiber entirely mechanically decoupled from a structure to measure temperature variations also does not provide sufficient temperature sensitivity. Likewise, calibrating the strain measurements requires a separate and independent measurement of the temperature in the vicinity of the structure undergoing the strain measurement, substantially minimizing temperature sensitivity in the optical fiber and substantially optimizing sensitivity in the optical fiber to bending and deformation of the structure as the structure is subjected to various forces.

SUMMARY OF THE INVENTION

The present disclosure relates generally to a system and a method for making temperature measurements distributed over a distance. In one aspect, the system comprises a plurality of Bragg grating measurement points disposed in an optical fiber with a predetermined spacing between adjacent Bragg grating measurement points. The system also comprises a substrate with the optical fiber disposed thereon, the optical fiber wrapped around the substrate with at least one predetermined wrap angle, the at least one predetermined wrap angle selected to distinguish a temperature measurement signal from a bending measurement signal, the substrate having a first coefficient of thermal expansion greater than a second coefficient of thermal expansion of the optical fiber.

In another embodiment, a system for making temperature measurements distributed over a distance comprises at least fifty Bragg grating measurement points disposed in an optical fiber with a predetermined spacing between adjacent Bragg grating measurement points. The system may comprise a substrate having a hollow tube portion with the optical fiber disposed thereon, the optical fiber wrapped around the hollow tube portion with at least one predetermined wrap angle less than about 90 degrees measured from the circumference of the hollow tube. The at least one predetermined wrap angle may be selected to distinguish a temperature measurement signal from a bending measurement signal, the substrate having a first coefficient of thermal expansion greater than a second coefficient of thermal expansion of the optical fiber.

In yet another aspect, a method for making temperature measurements distributed over a distance is provided, the method comprising disposing a plurality of Bragg grating measurement points in an optical fiber with a predetermined spacing between adjacent Bragg grating measurement points. The method also comprises wrapping the optical fiber helically around a substrate with at least one predetermined wrap angle, the at least one predetermined wrap angle selected to distinguish a temperature measurement signal from a bending measurement signal, the substrate having a first coefficient of thermal expansion greater than a second coefficient of thermal expansion of the optical fiber.

BRIEF DESCRIPTION OF THE DRAWINGS

The following figures form part of the present specification and are included to further demonstrate certain aspects of the present claimed subject matter, and should not be used to limit or define the present claimed subject matter. Consequently, a more complete understanding of the present embodiments and further features and advantages thereof may be acquired by referring to the following description taken in conjunction with the accompanying drawings, in which the leftmost significant digit(s) in the reference numerals denote(s) the first Figure in which the respective reference numerals appear, wherein:

It is to be noted, however, that the appended drawings illustrate only typical embodiments of the present claimed subject matter and are, therefore, not to be considered limiting of the scope of the present claimed subject matter, as the present claimed subject matter may admit to other equally effective embodiments.

DETAILED DESCRIPTION OF ILLUSTRATIVE EMBODIMENTS

The present disclosure relates generally to a system and a method for making temperature measurements distributed over a distance. More particularly, the present disclosure describes a system and a method useful for making high-resolution temperature measurements distributed over a distance. The present disclosure further relates to a method for producing a mineral hydrocarbon fluid.

The system and method described herein provide for fast-response, high-spatial-resolution distributed temperature (and, optionally, pressure) measurements in a well bore and/or any other system that requires temperature (and, optionally, pressure) measurements distributed over a distance. The system and method described herein improves on a Raman distributed temperature sensing (DTS) system in sensitivity, spatial resolution, and quickness of response. Whereas a typical Raman DTS system requires hours of signal averaging (photon counting), as described above, to measure with about 1 meter spatial resolution deep in a well, the system and method described herein, in various illustrative embodiments, may make such a measurement in less than 10 minutes, more preferably less than 60 seconds, more preferably less than 10 seconds, and still more preferably in about 1 second, with a spatial resolution of about 50 centimeters, more preferably less than 10 centimeters, more preferably less than 5 centimeters, and still more preferably about 1 centimeter. In various illustrative embodiments, the system and method described herein create a high-spatial-resolution distributed temperature sensing (DTS) system with more than about 50 (and in some cases thousands) of fiber Bragg grating (FBG) measurement points in a single optical fiber wrapped in a helix around a very small hollow tube. Unlike a wave-division multiplexing (WDM) Bragg grating system, various illustrative embodiments of the system and method described herein increase the number of FBG sensors and/or the density of the FBG sensors (close spacing) substantially. Unlike a conventional Raman DTS system, various illustrative embodiments of the system and method described herein have fast response and/or high spatial resolution.

Figure 5:
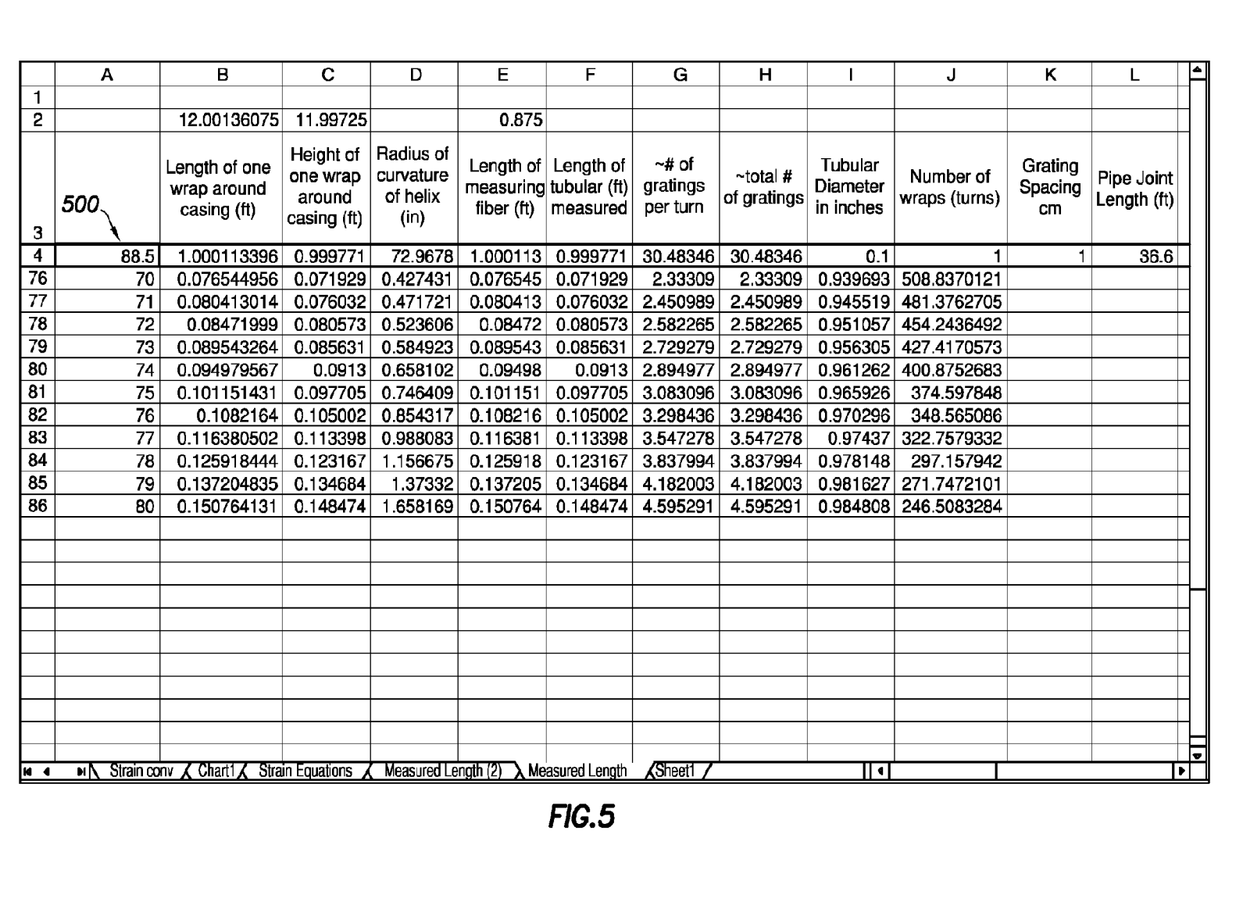
FIG. 5 schematically illustrates selection of a suggested wrap angle in a particular example representative of various illustrative embodiments of a distributed temperature sensing (DTS) system useful for making temperature measurements distributed over a distance.

As shown in FIG. 5, for example, wrapping an optical fiber, comprising a plurality of Bragg grating measurement points disposed in the optical fiber with a predetermined spacing between adjacent Bragg grating measurement points, around a rod and/or tube that expands (strains) with temperature substantially and significantly increases the temperature sensitivity of the DTS system measurement. A bare optical fiber DTS system, as indicated at 510, sees substantially no effect with a few tenths of a degree Celsius (Kelvin) swing in room temperature, while the optical fiber DTS system being attached to a polyurethane rod easily responds to such temperature changes of a few tenths of a degree Celsius (Kelvin) swing in room temperature, as indicated at 520. Indeed, unexpected results arise from wrapping an optical fiber, comprising a plurality of Bragg grating measurement points disposed in the optical fiber with a predetermined spacing between adjacent Bragg grating measurement points, around a hollow tube.

Bending of the substrate having a hollow tube portion therein gives a substantially pure sinusoidal signal in the optical fiber DTS system being wrapped around the hollow tube portion that may easily be separated from a substantially pure axial strain and/or a combination axial/radial strain. Furthermore, this separating out of the bending may only be done with a DTS system, as described and claimed herein, that has sufficient spatial resolution along the optical fiber. In various illustrative embodiments, the predetermined spacing between adjacent Bragg grating measurement points may be about 1 cm or so, for example. Substantially any tube that is inserted into a well bore will undergo bending. When separated out, the bending signal may be separately analyzed or simply ignored. The separated out strain signal of the optical fiber DTS system being wrapped around the hollow tube portion, if sufficiently decoupled from fixtures and/or other tubulars in the well bore surroundings, will be measuring only the ambient temperature of the well bore surroundings. The use of a hollow tube portion rather than a solid rod portion may ensure a minimum sensitivity to pressure changes, as long as the inside of the hollow tube is in fluid communication with the wellbore fluid.

Exploration and production of hydrocarbons from subterranean formations often requires precise measurements of various physical properties such as temperature and pressure downhole. As described U.S. Pat. Nos. 6,450,037; 6,363,089; 6,354,147; 6,346,702; and 6,252,656, optical fiber has been used to measure temperature, pressure, flow, and acoustics, for example. Optical fiber that is treated with fiber Bragg Gratings (FBGs) may be suitable for use in monitoring temperature-induced and/or pressure-induced strain in a tubular structure to which the optical fiber may be affixed. Fiber Bragg Gratings (FBGs) may be made by laterally exposing the core of a single-mode optical fiber to a periodic pattern of intense UV light. This creates areas of increased refractive index within the optical fiber. The fixed index modulation is referred to as a Fiber Bragg Grating (FBG). Substantially all reflected light signals combine coherently to one large reflection at one wavelength when the grating period is equal to about half the input wavelength. The FBG is substantially transparent to other wavelengths of light. Light, therefore, moves through the FBG with negligible attenuation and/or signal variation with only the Bragg wavelength being affected by being strongly back reflected at each FBG sensor.

Consequently, the center frequency of the FBG is directly related to the FBG period, which is affected by thermal and/or mechanical changes in the surrounding environment. Thus, temperature, pressure, strain, and other engineering parameters may be calculated by measuring the normalized change in reflected wavelength. Being able to preset and maintain the FBG wavelength is, thus, what makes FBG sensors so useful. Attaching optical fibers containing FBGs to substrates that are specifically designed for temperature measurements or pressure measurements has been done in various conventional systems. However, these conventional systems use a single point FBG or a very limited number of FBGs in temperature sensors or pressure sensors and rely on wave-division multiplexing (WDM) Bragg grating system optical fiber techniques that severely limit the number of FBG sensors on each optical fiber to at most 10, 20, or 30 or so, providing limited sensitivity and limited spatial resolution.

Similarly, a conventional Raman distributed temperature sensing (DTS) system typically requires hours of signal averaging (photon counting) to measure with about 1 meter resolution deep in a well. Such a conventional Raman distributed temperature sensing (DTS) system has limited sensitivity, limited spatial resolution, and slow response.

The following description refers to the use of a plurality of transducers that may comprise one or more conventional fiber Bragg grating (FBG) sensors such as, for example, the transducers described in U.S. Pat. Nos. 5,798,521, 6,426,496, and/or 6,854,327. U.S. Pat. No. 6,854,327, incorporated herein by reference, describes the use of bent, instead of stretched, FBG sensors that alter amplitude reflection and broaden frequency. The FBG sensors react to displacement forces with a predictable, altered, wavelength response that may be compared with a calibration curve to estimate shape and the magnitude of displacement. One embodiment is described as a helical-shaped optical fiber, wherein the FBG sensors are positioned in the bends of the optical fiber. The helical application of the FBG sensors around the structure reduces the strain transferred from the structure to the FBG sensors attached thereto. This embodiment, therefore, teaches that a helical wrap angle may permit the application of FBG sensors to a structure likely to encounter considerably greater strain than the FBG sensors may sustain. Various other embodiments are generally described for applying the bent FBG sensors (transducers) to a tubular structure, such as casing. U.S. patent application Ser. No. 11/107,270, filed Apr. 15, 2005, and published as U.S. Pat. App. Pub. No. 2006/0233482 on Oct. 19, 2006, which issued as U.S. Pat. No. 7,245,791 on Jul. 17, 2007, also incorporated herein by reference, describes methods for determining a preferred application of a plurality of transducers and/or sensors to a cylindrical structure for monitoring deformation of the structure as the structure is subjected to various forces and is also directed to methods for imaging deformation of an object as the object is subjected to various forces.

Figure 1A:
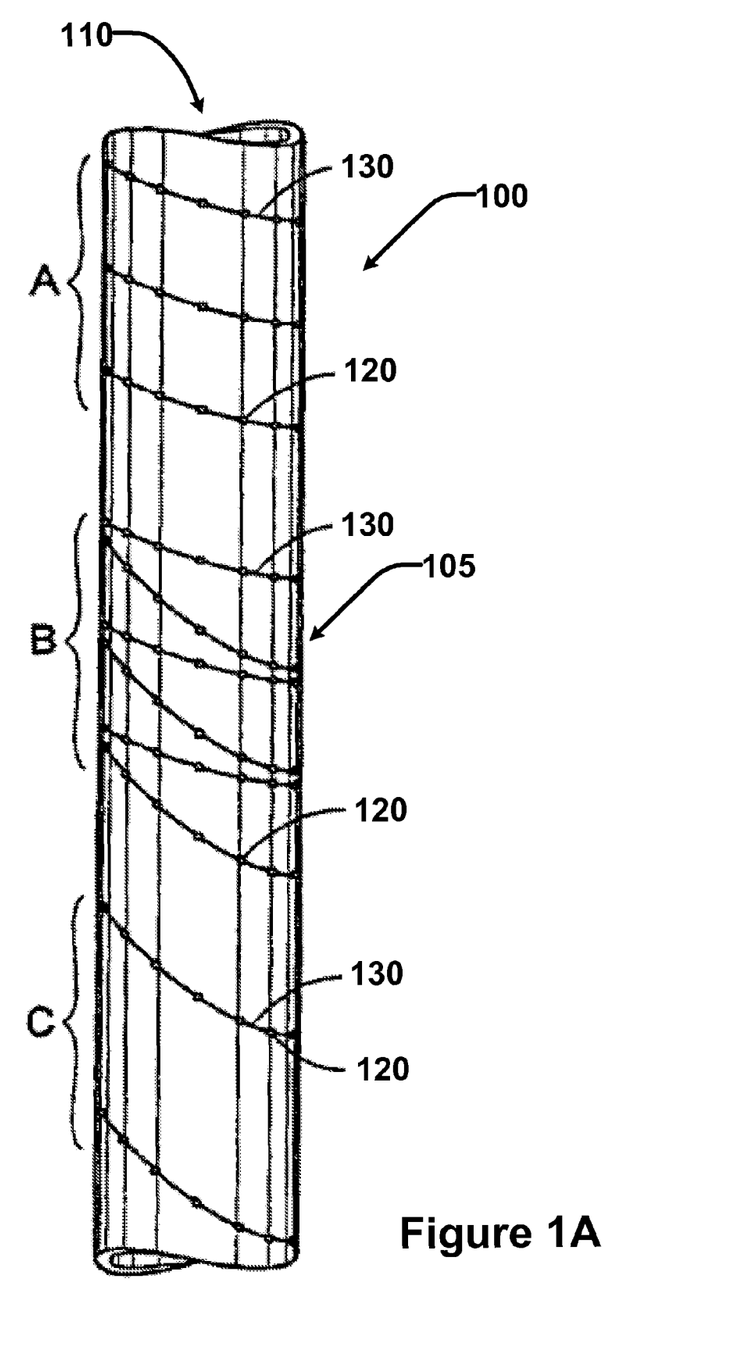
FIG. 1A schematically illustrates an elevational view of a cylindrical structure illustrating a plurality of sensors or transducers applied to the structure along three different sections (A, B, C) of the structure, relevant to various illustrative embodiments.
Figure 1B:
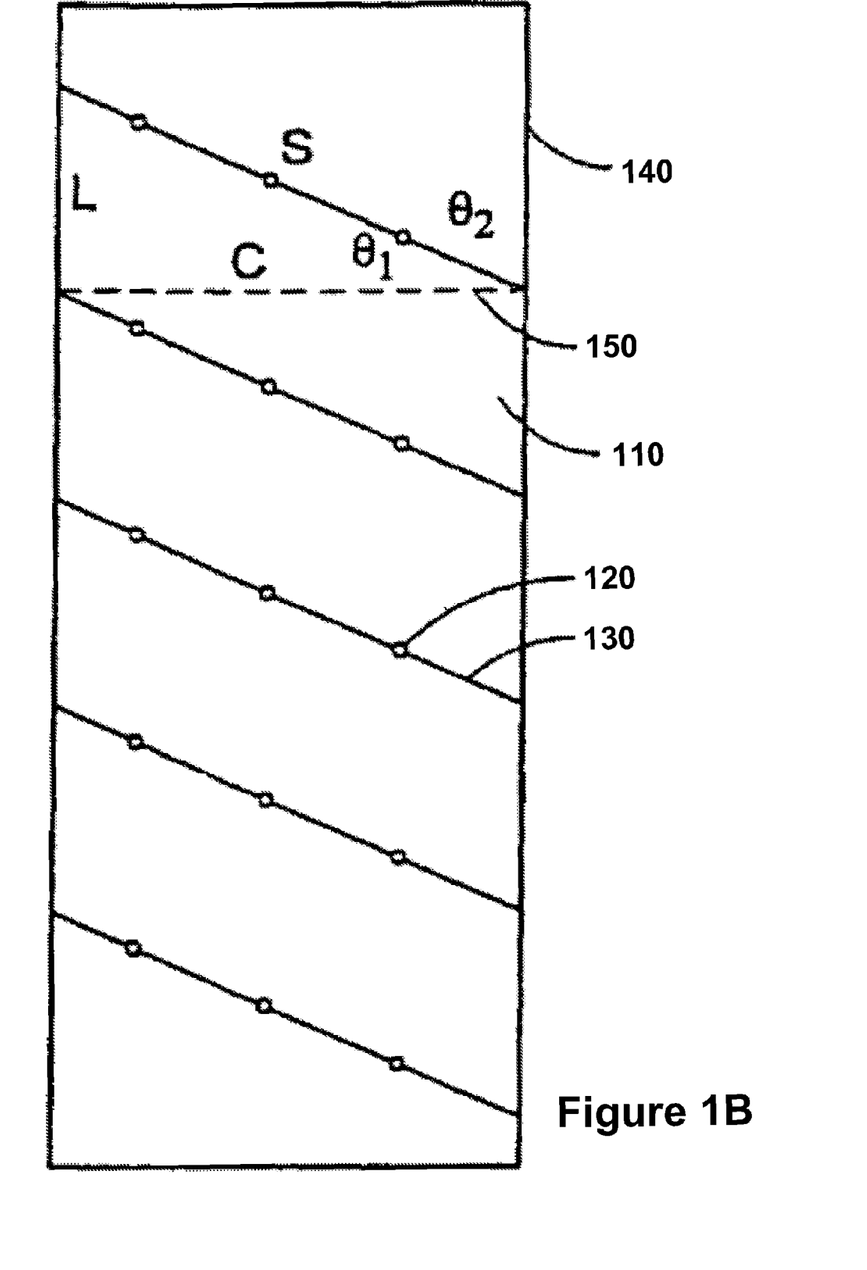
FIG. 1B schematically illustrates a linear perspective of section A in FIG. 1A, relevant to various illustrative embodiments.

Referring now to FIG. 1A, a system 100 is shown that may be used for distributed temperature measurements and/or pressure measurements, and an elevational view of substrate 105 comprising a cylindrical structure 110 such as, for example, a tubular structure (for example, a small hollow tube, a small diameter wire, a small diameter wire with alternating hollow tube and solid rod portions, a drill pipe, casing, and the like) is illustrated with a plurality of FBG type transducers 120 applied to the structure 110 on a fiber 130 at different preferred wrap angles in sections A, B and C. FIG. 1B is a linear perspective of section A in FIG. 1A, with the cylindrical structure 110 "unrolled" and laid out flat, illustrating the fiber 130 helically wrapped around the tubular 110 at a preferred wrap angle represented by $\theta_1$ or $\theta_2$ (the angle complementary to $\theta_1$). The preferred wrap angle may be measured relative to a first imaginary reference line 140 extending longitudinally along a surface of the structure 110. Alternatively, the preferred wrap angle may be measured relative to a second imaginary reference line 150 extending circumferentially around the structure 110, the second imaginary reference line 150 also representing the circumference (C) in FIG. 1B. For purposes of the following description, however, the preferred wrap angle is measured relative to the second imaginary reference line 150 and is represented by $\theta_1$. Nevertheless, $\theta_2$ could be used, instead, by simply substituting $$\frac{\pi}{2} - \theta_2$$

for $\theta_1$ and/or by calculating $\theta_1$ based on $\theta_2$ as $\theta_1=90°-\theta_2$.

Figure 1C:
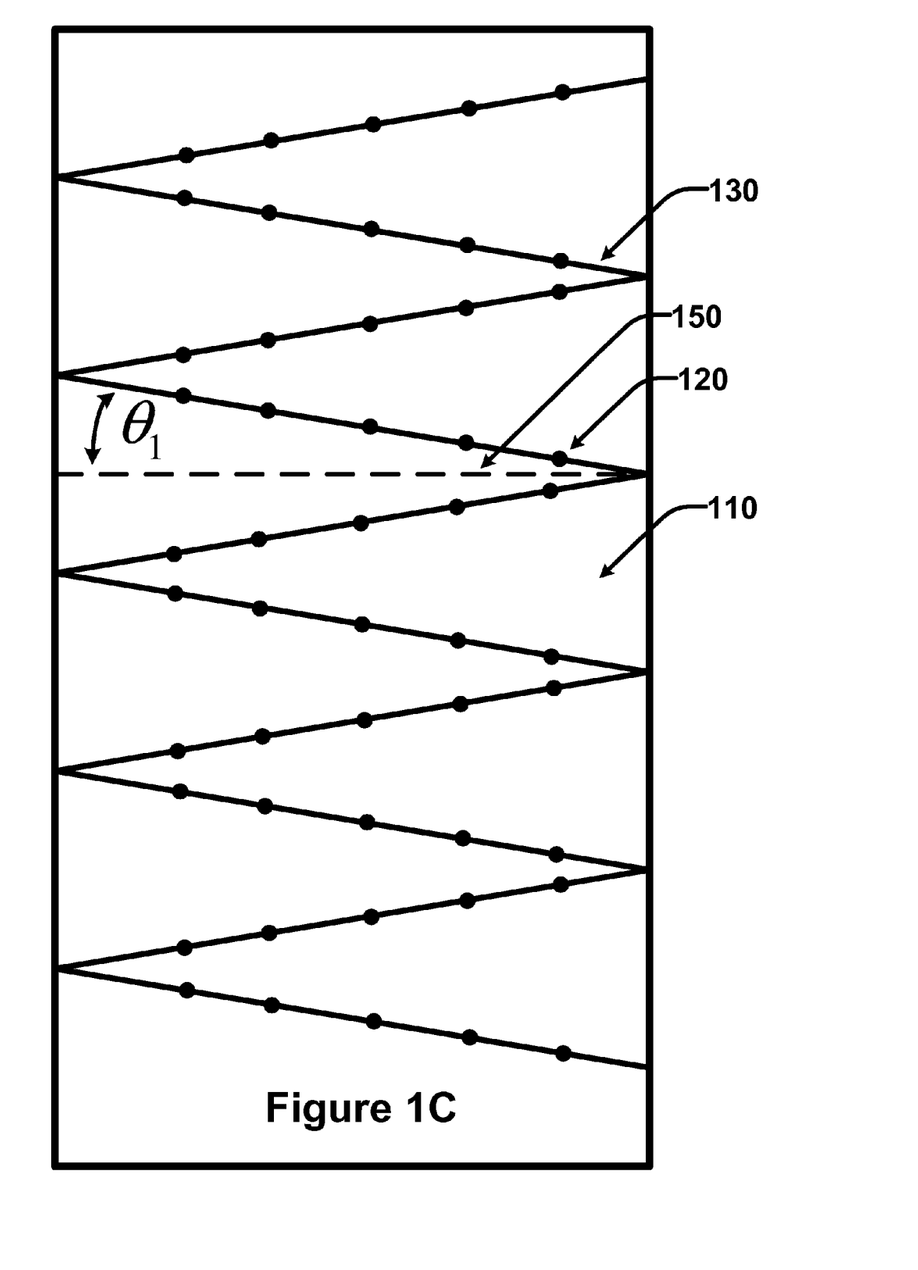
FIG. 1C schematically illustrates a linear perspective of a cylindrical structure illustrating a plurality of sensors or transducers applied to the structure, relevant to various alternative illustrative embodiments.
Figure 1D:
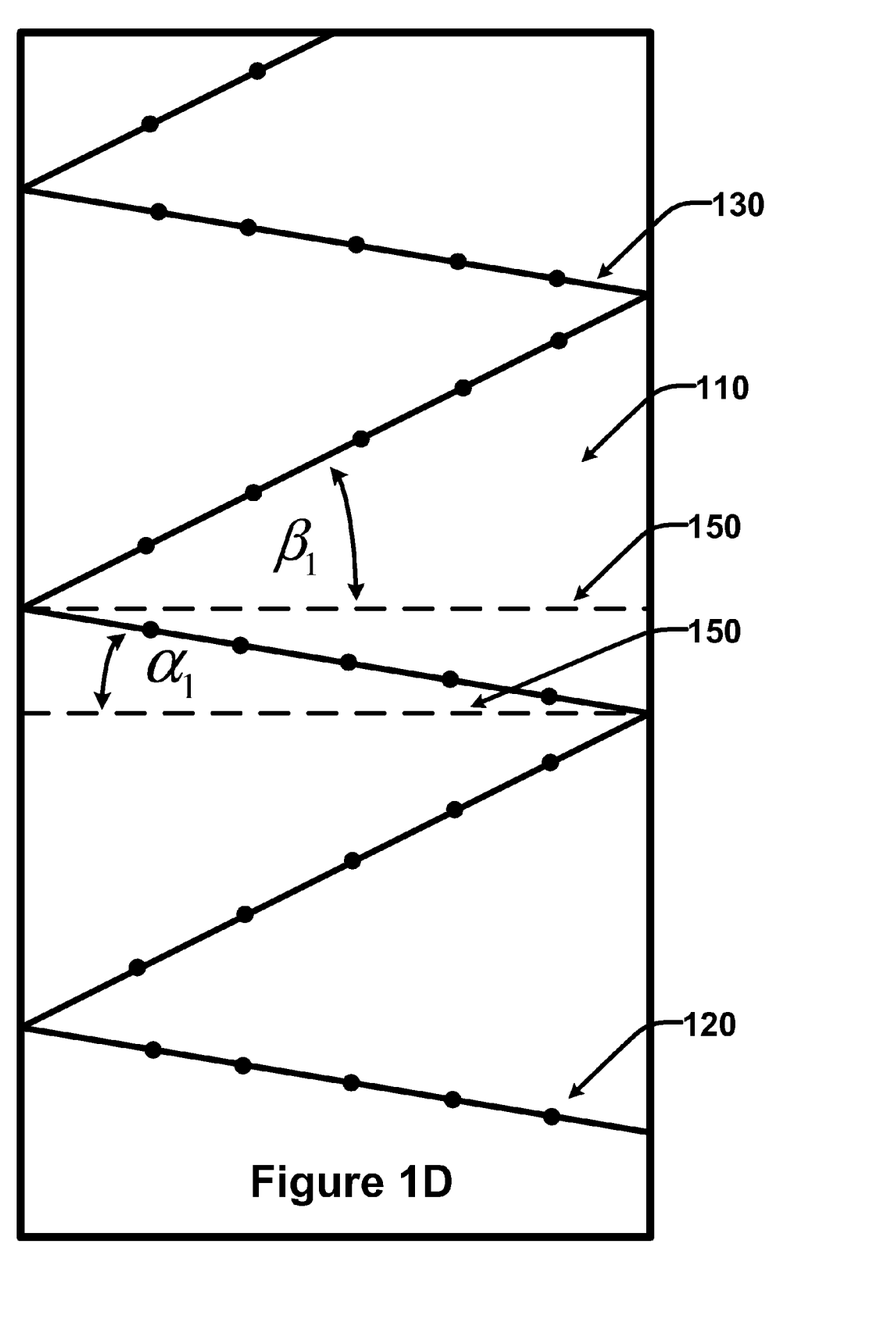
FIG. 1D schematically illustrates a linear perspective of a cylindrical structure illustrating a plurality of sensors or transducers applied to the structure, relevant to various other alternative illustrative embodiments.

FIG. 1C is a linear perspective of an alternative illustrative embodiment, with the cylindrical structure 110 "unrolled" and laid out flat, illustrating the fiber 130 helically wrapped around the whole circumference of the tubular 110 in a zig-zag fashion at a preferred wrap angle represented by $\theta_1$, also measured relative to the second imaginary reference line 150. FIG. 1D is a linear perspective of another alternative illustrative embodiment, with the cylindrical structure 110 "unrolled" and laid out flat, illustrating the fiber 130 helically wrapped around the whole circumference of the tubular 110 also in a zig-zag fashion at two preferred wrap angles represented by $\alpha_1$ and $\beta_1$, both measured relative to the second imaginary reference line 150.

In FIG. 1B, the length of one wrap of fiber 130 around the structure 110 is represented as S. The vertical distance between each wrap of fiber 130 is represented as L. Relationships between $\theta_1$, L, S, and C are illustrated by: $L=S \sin(\theta_1)$ and $C=S \cos(\theta_1)$. In this transformed geometry, S represents the hypotenuse of a right triangle formed by L, C, and S.

Axial strain along the axis of the structure 110 caused by compaction can be represented as $\epsilon=\Delta L/L$. Axial strain along the axis of the structure 110 caused by compaction can be translated to strain in the transducer 120 and represented as $\epsilon_f=\Delta S/S$, which may manifest itself in the transducer 120 as axial, hoop and/or sheer stress. The relationship between strain ($\epsilon_f$) in the transducer 120 and its wavelength response is therefore, represented by:

$$\Delta\lambda=\lambda(1-P_e)K\epsilon_f$$

where $\Delta\lambda$ represents a transducer wavelength shift due to strain ($\epsilon_f$) imposed on the transducer 120 and $\lambda$ represents the average wavelength of the transducer 120. The bonding coefficient of the transducer 120 to a substrate or system on which the strain is to be measured is represented by K.

A "combined" response for bending (also buckling, shearing), axial strain, and strain due to thermal expansion may be represented by:

$$\Delta\lambda = \lambda(1 - P_e)$$

$$K\left[\left(-1 + \sqrt{\sin^2\theta_1\left(1 - \left[\varepsilon - \frac{r\cos\varphi}{R}\right]\right)^2 + \cos^2\theta_1\left(1 + v\left[\varepsilon - \frac{r\cos\varphi}{R}\right]\right)^2}\right) + \alpha_{eff}(T - T_0)\right]$$

wherein $\Delta\lambda$ is the wavelength shift measured on a given grating and $\lambda$ is the original wavelength of the Bragg grating of the transducer 120, where $\lambda$ may nominally be about 1560 nm. The $(1-P_e)$ factor is a fiber response that may nominally be about 0.8. The bonding coefficient K may be about 0.9 or greater. The wrap angle (or orientation angle of the sensor) with respect to the circumference C (the second imaginary axis line 150) is represented by $\theta_1$. The axial strain $\epsilon=\Delta L/L$ on the tubular structure 110 may be from compaction or another external source. The radius of the tubular or cylindrical structure 110 is represented by r, and $\phi$ is an arbitrary azimuthal angle with respect to some reference plane passing through the axis of the tubular structure 110 that allows for the orientation of the direction of the buckle or bend. The bend radius of the buckle or bend in the tubular structure 110 is represented by R. As the bend radius R gets very large (as is the case with substantially straight unbent pipe, for example), this portion of the signal becomes vanishingly small. The Poisson ratio $\nu$ of the tubular structure 110 may change with strain. An independent measurement may be employed to extract the value of the Poisson ratio $\nu$, for example, by using two different wrap angles substantially simultaneously, such as is shown at B in FIG. 1A, and then solving for the Poisson ratio $\nu$. The coefficient of thermal expansion is represented by $\alpha_{\it eff}$, the current temperature is represented by T, and the initial or baseline or calibration temperature is represented by $T_0$.

For simplicity in the examples that follow, the bonding coefficient (K) is assumed to be constant. $P_e$ represents the strain and temperature effect on the index of refraction of the transducer 120. $P_e$ may be a function of strain and temperature, including torque on the transducer 120, but is neglected in the following examples. Since it is well known that temperature variations may impart additional strain to the fiber 130, the transducers 120 and structure 110, which affect the index of refraction in the fiber 130, temperature variations may be considered independently for calibrating the strain measurements. This can easily be done either by a separate temperature measurement that could be performed by mechanically decoupling short lengths of the fiber 130 from the structure 110, using a separate but similar fiber that is entirely decoupled mechanically from the structure 110 or by any other means of measuring the temperature in the vicinity of the structure 110 undergoing the strain measurement.

The foregoing properties may be used to relate the strain ($\epsilon_f$) in the transducer 120 to the axial compaction strain ($\epsilon$) in the structure 110. The strain ($\epsilon_f=\Delta S/S$) in the transducer 120 can be related to the preferred wrap angle ($\theta_1$) and the strain ($\epsilon=\Delta L/L$) along the axis of the structure 110 by:

$$\epsilon_f=\Delta S/S=-1+\sqrt{(1-\epsilon)^2\sin(\theta_1)^2+(1+\nu\epsilon)^2\cos(\theta_1)^2}$$

where $\nu$ is the Poisson ratio. The Poisson ratio ($\nu$) is an important property of the structure 110, which is relevant to the strain ($\epsilon$) the structure 110 may encounter as illustrated in the examples to follow.

The strain factor $m=\epsilon_f/\epsilon$ relating axial strain ($\epsilon$) in the structure 110 to strain ($\epsilon_f$) transmitted to the transducer 120 is represented by:

$$m=(-1+\sqrt{(1-\epsilon)^2\sin(\theta_1)^2+(1+\nu\epsilon)^2\cos(\theta_1)^2})/\epsilon,$$

which may also be translated to:

$$\epsilon_f=\Delta S/S=m\Delta L/L=m\epsilon.$$

Comparison of the strain factor (m) to other variables reveals that it is highly sensitive to the preferred wrap angle ($\theta_1$), somewhat sensitive to the Poisson ratio ($\nu$), and quite insensitive to applied axial strain ($\epsilon$).

Application of the Transducers

The primary requirements for sensitivity and resolution are a sufficient number of transducers 120 positioned around the circumference (C) of the structure 110 and adequate vertical spacing between the transducers 120 so that a sinusoidal pattern associated with a bend, buckle, shear or crushing (ovalization) force can be clearly detected and imaged or ignored, as needed. As demonstrated by the relationships below, sensitivity to axial strain and radial strain, and hence bending strain, is also a function of the preferred wrap angle ($\theta_1$).

Preferably, at least ten transducers 120 per wrap of the fiber 130 are used to adequately capture one cycle of the sinusoidal signal produced by a deformation of the structure 110. It is also desirable to have at least eight to ten turns or wraps of the fiber 130 covering the vertical distance of the structure 110 over which the deformation is expected to occur. Fewer transducers 120 will reduce the resolution and ability to unambiguously distinguish between a bend, buckle, shear or crushing type deformation. In terms of the preferred wrap angle ($\theta_1$) and the diameter (D) (in inches) of the structure 110, the length of structure 110 (in feet) covered by each wrap is represented as:

$$L_1 = \frac{\pi D \tan(\theta_1)}{12}.$$

To obtain the length of the structure 110 in meters, the length of the structure 110 (in feet) may be multiplied by about 0.30. To obtain the diameter in centimeters, the diameter (in inches) may be multiplied by about 2.54.

In terms of the preferred wrap angle ($\theta_1$) and the diameter (D) (in inches) of the structure 110, the length of one wrap around the structure 110 (in feet) is represented as:

$$S_1 = \frac{\pi D}{12\cos(\theta_1)}.$$

To obtain the length of one wrap around the structure 110 in meters, the length of one wrap around the structure 110 (in feet) may be multiplied by about 0.30.

The total length of the fiber 130 (in feet) based on a preferred number of wraps ($N_w$) around the structure 110 and the length of one wrap ($S_1$) around the structure 110 (in feet) is represented as:

$$S=S_1 N_w.$$

The axial length of the fiber 130 (in feet) along the structure 110 is based on a preferred number of wraps ($N_w$) around the structure 110 and the length of structure 110 (in feet) covered between each wrap is represented as:

$$Z=L_1 N_w.$$

Thus, the preferred number of wraps ($N_w$) around the structure 110 may be determined by the axial length ($Z=L_1 N_w$) of the structure 110 wrapped in the fiber 130 divided by the length ($L_1$) of structure 110 covered between each wrap of the fiber 130. In addition to the preferred wrap angle ($\theta_1$), the preferred number of wraps ($N_w$) may be used to determine a preferred application of the fiber 130 and transducers 120 to the structure 110.

The transducer 120 spacing may be as short as 1 centimeter or as long as necessary to accommodate a judicious number of transducers 120 per wrap of the fiber 130 on a structure 110 having a small diameter. In various illustrative embodiments, there may be at least about two transducers 120 per wrap of the fiber 130 on a structure 110 having a small diameter. In various alternative illustrative embodiments, there may be at least about 5 transducers 120 per wrap of the fiber 130 on a structure 110 having a small diameter. The total number of transducers 120 per wrap of the fiber 130 as a function of transducer 120 spacing ($S_g$) (in centimeters) and wrap length ($S_1$, in feet) is represented as:

$$n = \frac{(2.54)S_1(12)}{S_g} = \frac{(2.54)\pi D}{S_g \cos(\theta_1)}.$$

Assuming that all of the transducers 120 on the fiber 130 are within the wrapped portion of the fiber 130, then the total number of transducers 120 on the fiber 130 is represented as:

$$N = \frac{(2.54)S(12)}{S_g} = \frac{(2.54)S_1 N_w(12)}{S_g} = \frac{(2.54)N_w \pi D}{S_g \cos(\theta_1)}$$

Similarly, the preferred transducer 120 spacing ($S_g$) may be easily determined with a known preferred number of transducers 120 (N) and a predetermined total length (S) of fiber 130.

Roughly, the maximum number of transducers 120 that can be used on one fiber 130 with this technique is about 1000, in various illustrative embodiments. Thus, the preferred wrap angle ($\theta_1$), the preferred number of wraps ($N_w$) and the preferred number of transducers 120 (N) may be used to determine a preferred application of the fiber 130 and transducers 120 to the structure 110.

Figure 2:
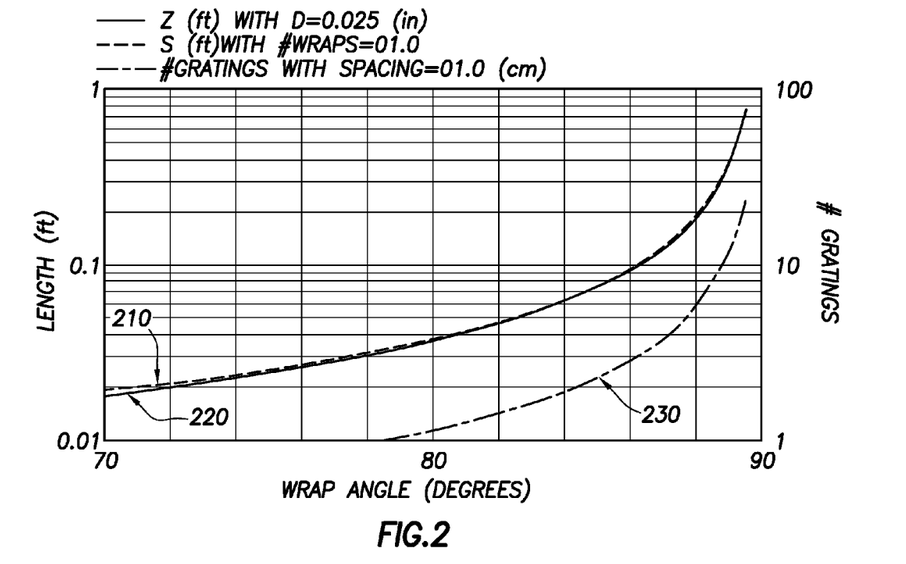
FIG. 2 schematically illustrates a graph showing the determination of preferred number of transducers and preferred number of wraps needed to cover a predetermined length.
Figure 3:
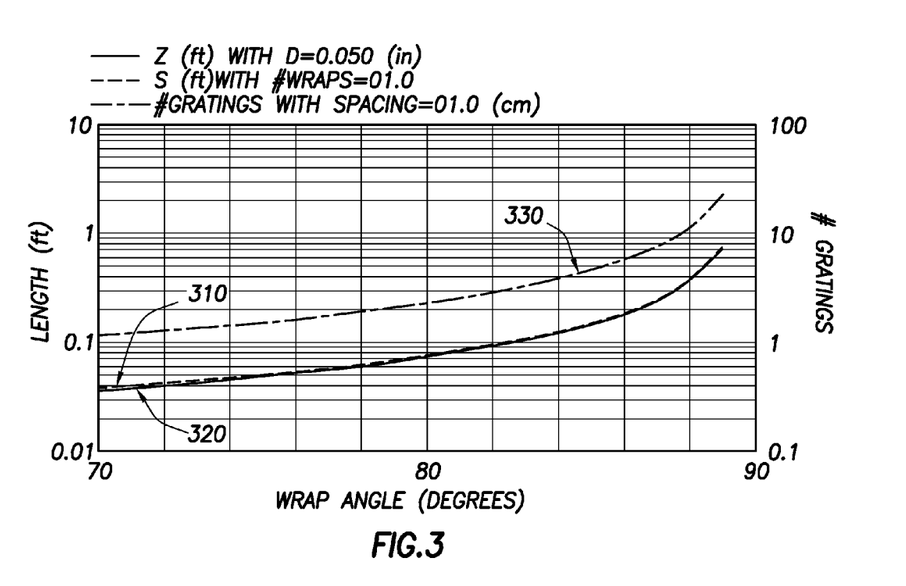
FIG. 3 schematically illustrates another graph showing the determination of preferred number of transducers and preferred number of wraps needed to cover a predetermined length.
Figure 4:
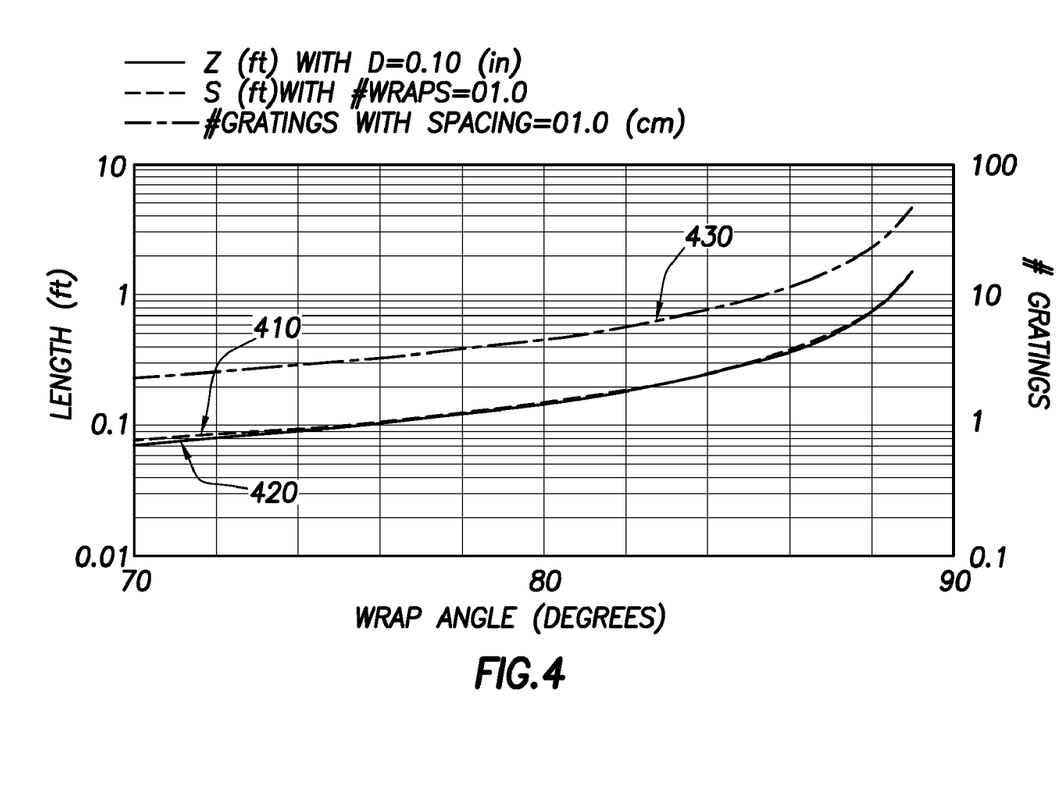
FIG. 4 schematically illustrates yet another graph showing the determination of preferred number of transducers and preferred number of wraps needed to cover a predetermined length.

Using the previous equations, plots such as the ones in FIGS. 2-4 may be compiled and used to determine the preferred number of transducers (N) and the preferred number of wraps ($N_w$) needed to cover a predetermined length and diameter for the structure 110 and the preferred transducer 120 spacing ($S_g$). Plotted on the left axes are the length of the fiber (S, in units of about 0.30 meter, corresponding to feet), as shown at 210, 310, 410 and the axial length (Z, in units of about 0.30 meter, corresponding to feet), as shown at 220, 320, 420 of the structure 110 wrapped in the fiber 130 that may be compared to a wrap angle ($\theta_1$) range for a predetermined number of wraps ($N_w$) and a predetermined transducer 120 spacing ($S_g$). Plotted on the right axes are the total number of gratings or transducers 120 per wrap (n), as shown at 230, 330, 430 that may be compared to the wrap angle ($\theta_1$) range for a predetermined transducer 120 spacing ($S_g$) and a predetermined number of wraps ($N_w$).

In FIG. 2, the axial length (Z, in units of about 0.30 meter, corresponding to feet) of the structure 110 wrapped in the fiber 130 is plotted against the wrap angle ($\theta_1$) for the case where the diameter of the structure 110 D=0.0635 cm (about 0.025 inch), as shown at 220. The length of the fiber (S, in units of about 0.30 meter, corresponding to feet) is plotted against the wrap angle ($\theta_1$) for the case where the number of wraps ($N_w$=1), as shown at 210. The total number of gratings or transducers 120 per wrap (n=N/$N_w$) is plotted against the wrap angle ($\theta_1$) for the case where the transducer 120 spacing ($S_g$=1 cm), as shown at 230.

In FIG. 3, the axial length (Z, in units of about 0.30 meter, corresponding to feet) of the structure 110 wrapped in the fiber 130 is plotted against the wrap angle ($\theta_1$) for the case where the diameter of the structure 110 D=0.127 cm (about 0.05 inch), as shown at 320. The length of the fiber (S, in units of about 0.30 meter, corresponding to feet) is plotted against the wrap angle ($\theta_1$) for the case where the number of wraps ($N_w$=1), as shown at 310. The total number of gratings or transducers 120 per wrap (n=N/$N_w$) is plotted against the wrap angle ($\theta_1$) for the case where the transducer 120 spacing ($S_g$=1 cm), as shown at 330.

In FIG. 4, the axial length (Z, in units of about 0.30 meter, corresponding to feet) of the structure 110 wrapped in the fiber 130 is plotted against the wrap angle ($\theta_1$) for the case where the diameter of the structure 110 D=0.254 cm (about 0.1 inch), as shown at 420. The length of the fiber (S, in units of about 0.30 meter, corresponding to feet) is plotted against the wrap angle ($\theta_1$) for the case where the number of wraps ($N_w$=1), as shown at 410. The total number of gratings or transducers 120 per wrap (n=N/$N_w$) is plotted against the wrap angle ($\theta_1$) for the case where the transducer 120 spacing ($S_g$=1 cm), as shown at 430.

In FIG. 2, the diameter of the structure 110 D=0.0635 cm (about 0.025 inch), the number of wraps $N_w$=1, and the transducer 120 spacing $S_g$=1 cm. FIG. 2 shows that wrap angles ($\theta_1$) between about 87 degrees and about 90 degrees provide at least about 4 gratings or transducers 120 per wrap (n=N/$N_w$). FIG. 2 shows that wrap angles ($\theta_1$) between about 87 degrees and about 90 degrees tend to optimize resolution considering the length of the fiber 130 (S) and the length of the structure 110 (Z) being monitored. This information may be used with the strain factor ($m=\epsilon_f/\epsilon=(\Delta S/S)/(\Delta Z/Z)=(\Delta S/S)/(\Delta L/L)$) to design a preferred application of the fiber 130 to the structure 110.

In FIG. 3, the diameter of the structure 110 D=0.127 cm (about 0.05 inch), the number of wraps $N_w$=1, and the transducer 120 spacing $S_g$=1 cm. FIG. 3 shows that wrap angles ($\theta_1$) between about 84 degrees and about 90 degrees provide at least about 4 gratings or transducers 120 per wrap (n=N/$N_w$). FIG. 3 shows that wrap angles ($\theta_1$) between about 84 degrees and about 90 degrees tend to optimize resolution considering the length of the fiber 130 (S) and the length of the structure 110 (Z) being monitored. This information may be used with the strain factor ($m=\epsilon_f/\epsilon=(\Delta S/S)/(\Delta Z/Z)=(\Delta S/S)/(\Delta L/L)$) to design a preferred application of the fiber 130 to the structure 110.

In FIG. 4, the diameter of the structure 110 D=0.254 cm (about 0.1 inch), the number of wraps $N_w$=1, and the transducer 120 spacing $S_g$=1 cm. FIG. 4 shows that wrap angles ($\theta_1$) between about 78 degrees and about 90 degrees provide at least about 4 gratings or transducers 120 per wrap (n=N/$N_w$). FIG. 4 shows that wrap angles ($\theta_1$) between about 78 degrees and about 90 degrees tend to optimize resolution considering the length of the fiber 130 (S) and the length of the structure 110 (Z) being monitored. This information may be used with the strain factor ($m=\epsilon_f/\epsilon=(\Delta S/S)/(\Delta Z/Z)=(\Delta S/S)/(\Delta L/L)$) to design a preferred application of the fiber 130 to the structure 110.

FIG. 5 schematically illustrates selection of a suggested wrap angle $\theta_1$ in a particular example representative of various illustrative embodiments of a distributed temperature sensing (DTS) system 100 useful for making temperature measurements distributed over a distance, according to the present disclosure. The DTS system 100 may comprise the plurality of Bragg grating measurement points 120 disposed in the optical fiber 130 with a predetermined spacing of about 1 cm between adjacent Bragg grating measurement points 120. The DTS system 100 may also comprise the substrate 105 having a hollow tube portion 110 with the optical fiber 130 disposed thereon, the optical fiber 130 being helically wrapped around the hollow tube portion 110 with at least one predetermined wrap angle $\theta_1$ of about 88.5 degrees, measured from the circumference (C, line 150), as indicated at 500. In this particular example, the hollow tube portion 110 may have a diameter of about 0.1 inch (0.254 cm), as shown in FIG. 4, for example. The suggested wrap angle of $\theta_1 \approx 88.5°$ achieves a required spatial resolution both length-wise and azimuthally around such a hollow tube portion 110 having a diameter of about 0.1 inch (0.254 cm). In various illustrative embodiments, the hollow tube portion 110 may have a diameter of in a range of about 0.01 inch (0.0254 cm) to about 1 inch (2.54 cm), and the suggested wrap angle $\theta_1$ may be any angle less than 90 degrees.

As shown in FIG. 5, for the suggested wrap angle of $\theta_1 \approx 88.5°$, the length of one wrap around the hollow tube portion 110 having a diameter of about 0.1 inch (0.254 cm) is $S_1 \approx 1.000113396$ feet (30.48346 cm), the height of one wrap around the hollow tube portion 110 having the diameter of about 0.1 inch (0.254 cm) is $L_1 \approx 0.999771$ feet (30.47302 cm), the radius of curvature of the helix is $R_c \approx 72.9678$ inches (185.3382 cm), the length of the measuring fiber 130 is $S \approx 1.000113$ feet (30.48344 cm), and the length of the hollow tube portion 110 measured is $Z \approx 0.999771$ feet (30.47302 cm). As also shown in FIG. 5, for the suggested wrap angle of $\theta_1 \approx 88.5°$, the number of Bragg grating measurement points 120 per turn $n \approx 30.48346$, the total number of Bragg grating measurement points 120 $N \approx 30.48346$, the ratio of the length of the hollow tube portion 110 measured to the length of the measuring fiber 130 is $Z/S \approx 0.9996576$, and the number of wraps (or turns) $N_w = 1$.

As illustrated in FIGS. 2-5, a number of other variables, including the preferred number of transducers (N) and the preferred number of wraps ($N_w$), may also be considered in determining the preferred application of the transducers 120 to the structure 110 based on sensitivity and spatial resolution requirements.

Restrictions on the number of transducers 120 (N), the wrap length (Z) and the transducer 120 spacing ($S_g$) may be overcome using multiple wrap angles. Therefore, multiple wrap angles may be used to extend the measuring length of a single region along the structure 110 or span multiple zones along the structure 110 as illustrated in sections A, B and C of FIG. 1A. The addition of multiple wrap angles may also be used to branch into multiple structures 110 such as multi-lateral wells.

Although the wavelength response is more complicated, the application of the fiber 130 and the transducers 120 at variable wrap angles may also be desirable. Configurations utilizing multiple and variable wrap angles over a single section of the structure 110, like section B in FIG. 1A, may be preferred. Other configurations, such as those suggested in U.S. Pat. No. 6,854,327, may be used, however.

Figure 6:
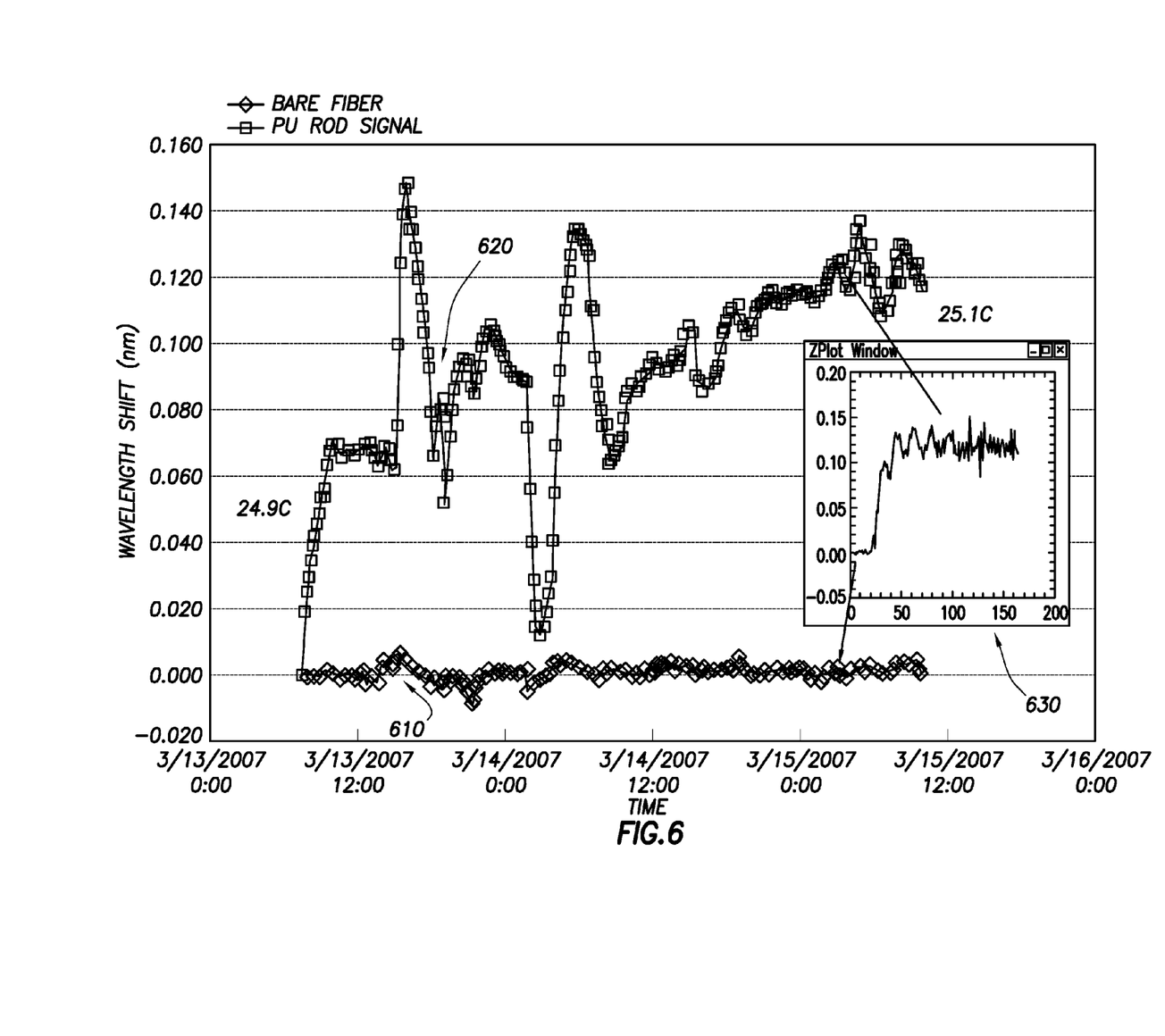
FIG. 6 schematically illustrates that wrapping an optical fiber around a rod or tube that expands (strains) with temperature substantially increases the temperature sensitivity of the optical fiber temperature measurement.

As shown in FIG. 6, for example, in various illustrative embodiments, the system 100 may involve wrapping the optical fiber 130, comprising the plurality of Bragg grating measurement points 120 disposed in the optical fiber 130 with a predetermined spacing $S_g$ between adjacent Bragg grating measurement points 120, around the rod and/or the tube 110 that expands (strains) with temperature substantially and significantly increases the temperature sensitivity of the distributed temperature sensing (DTS) system 100 measurement, using, for example, a small diameter substantially hollow tube 110. A bare optical fiber DTS system, as indicated at 610, sees substantially no effect with a few tenths of a degree Celsius (Kelvin) swing in room temperature, while the optical fiber DTS system 100 being attached to a polyurethane rod easily responds to such temperature changes of a few tenths of a degree Celsius (Kelvin) swing in room temperature, as indicated at 520. Indeed, unexpected results arise from wrapping an optical fiber 130, comprising a plurality of Bragg grating measurement points 120 disposed in the optical fiber 130 with a predetermined spacing between adjacent Bragg grating measurement points 120, around a hollow tube 110.

Bending of the substrate 105 having the hollow tube portion 110 therein gives a substantially pure sinusoidal signal in the optical fiber 130 of the DTS system 100 being wrapped around the hollow tube portion 110 that may easily be separated from a substantially pure axial strain and/or a combination axial/radial strain. Furthermore, this separating out of the bending may only be done with a DTS system 100, as described and claimed herein, that has sufficient spatial resolution along the optical fiber 130. In various illustrative embodiments, the predetermined spacing $S_g$ between adjacent Bragg grating measurement points 120 may be about 1 cm or so, for example. Substantially any tube that is inserted into a well bore will undergo bending. When separated out, the bending signal may be separately analyzed or simply ignored. The separated out strain signal of the optical fiber 130 of the DTS system 100 being wrapped around the hollow tube portion 110, if sufficiently decoupled from fixtures and/or other tubulars in the well bore surroundings, will be measuring only the ambient temperature of the well bore surroundings. The use of a hollow tube portion 110 rather than a solid rod portion, such as solid rod portion 730, as shown in FIG. 7, for example, and as described in more detail below, may ensure a minimum sensitivity to pressure changes.

Winding the optical fiber 130 in a helical fashion around the hollow tube portion 110 of the substrate 105, rather than longitudinally along the hollow tube portion 110 of the substrate 105, allows the bend response to be clearly differentiated from the thermal strain response, as shown, for example, in FIG. 6. A very slight bend may be seen as a sinusoidal signal, as indicated at 630. Simply averaging over the sinusoidal region yields an average strain value, which may then be related to temperature, by calibration of the temperature response of the substrate 105, for example. FIG. 6 demonstrates the response of the signal (of a system similar in principle to various illustrative embodiments of the DTS system 100) tracking the room temperature even though the room temperature is held very close to constant. The room temperature varied by a few tenths of a degree Celsius (Kelvin) as read by a digital thermometer in the room.

Figure 7:
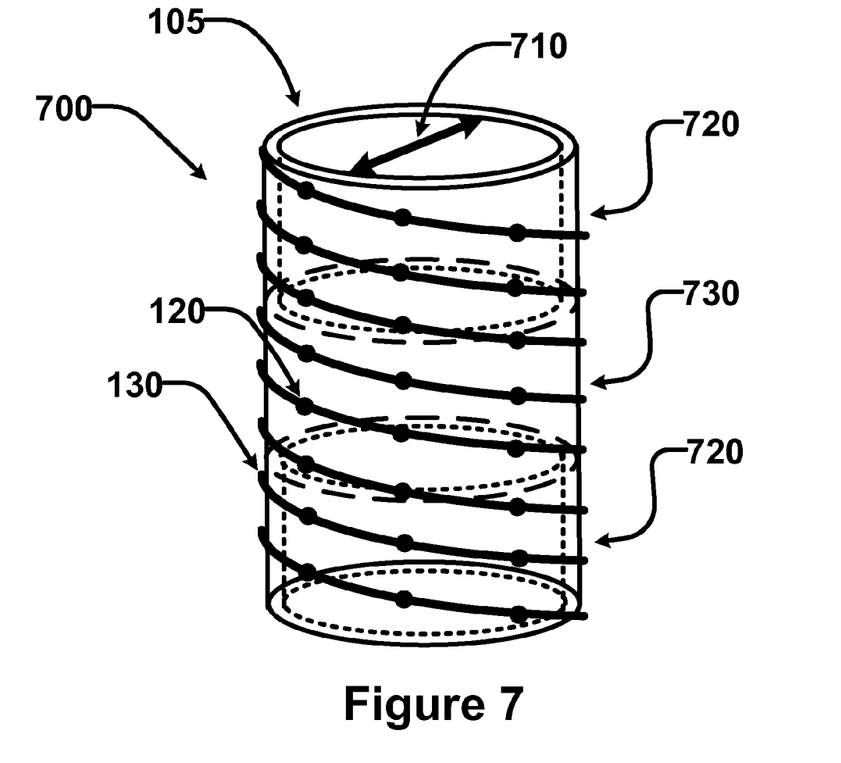
FIG. 7 schematically illustrates a particular example representative of various illustrative embodiments of a system useful for making temperature measurements distributed over a distance.

FIG. 7 schematically illustrates a particular example representative of various illustrative embodiments of a distributed temperature sensing (DTS) and a distributed pressure sensing (DPS) system 700 useful for making temperature measurements distributed over a distance, according to the present disclosure. The DTS/DPS system 700 may comprise the substrate 105 being substantially cylindrical with a diameter 710 and having alternating sections or portions comprising at least one hollow tube portion 720 and at least one solid rod portion 730 wrapped by the optical fiber 130 with the plurality of Bragg grating measurement points 120 so that both distributed temperature measurements and distributed pressure measurements may be made over a distance. The hollow tube portion 720 may be used to ensure a substantially minimal sensitivity to pressure changes. The solid rod portion 730 may be used to ensure a substantially maximal sensitivity to pressure changes.

The substrate 105 may have a first coefficient of thermal expansion greater than a second coefficient of thermal expansion of the optical fiber 130. For example, the substrate 105 may comprise a leucite ceramic. Leucite ($KAlSi_2O_6$) when prepared with nepheline exhibits a thermal expansion coefficient of about $28 \times 10^{-6}/°$ C. from room temperature (about 25° C.) to about 600° C. This may be compared to the optical fiber 130 that has a typical reported thermal expansion coefficient of about $5.5 \times 10^{-7}/°$ C. over a temperature range of from about 20° C. to about 300° C. In various illustrative embodiments, the coefficient of thermal expansion of the substrate 105 may be at least about $13 \times 10^{-6}/°$ C. from room temperature (about 25° C.) to about 600° C.

Figure 8:
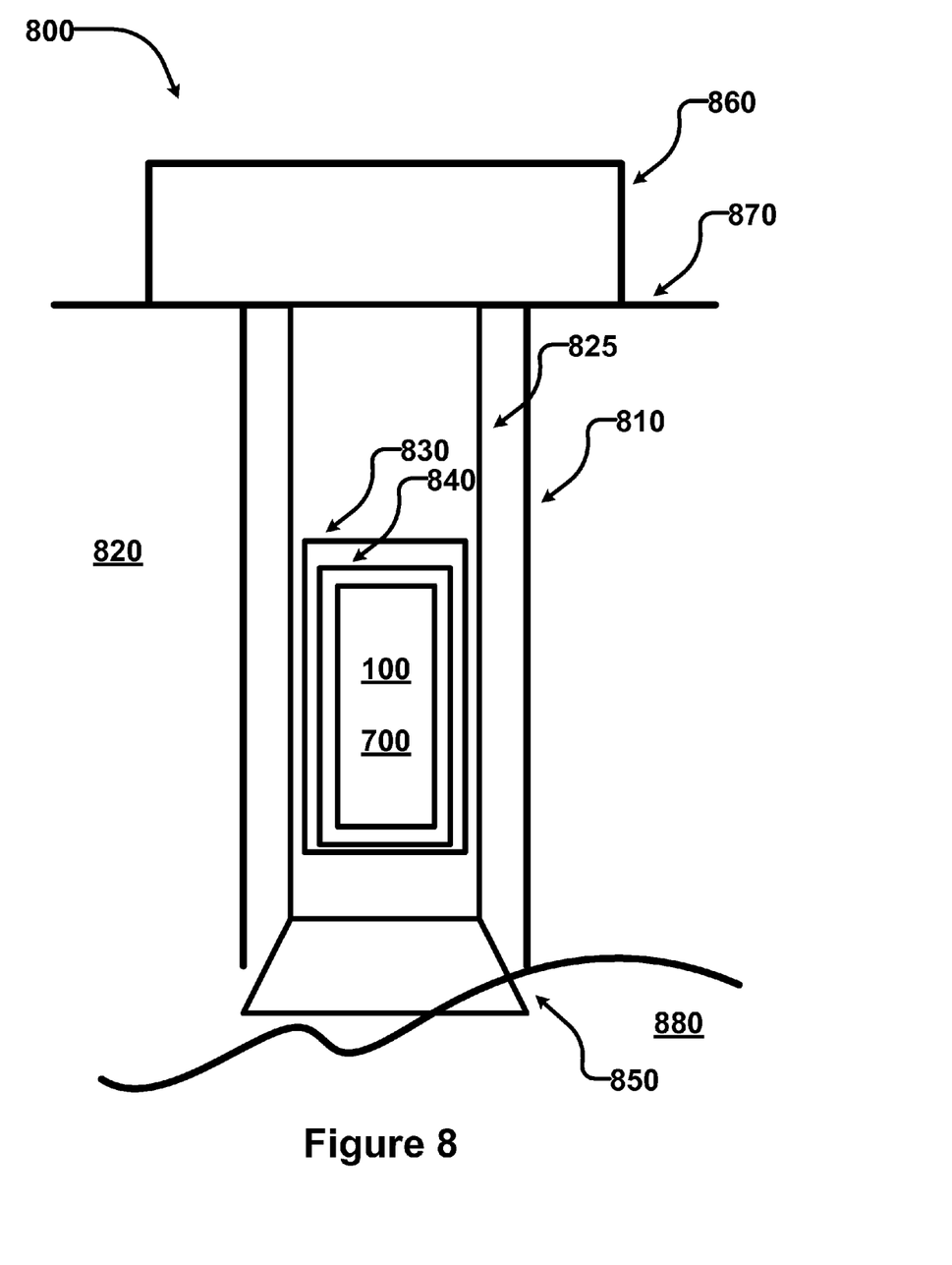
FIG. 8 schematically illustrates another particular example representative of various illustrative embodiments of a system useful for making temperature measurements distributed over a distance.

FIG. 8 schematically illustrates a particular example representative of various illustrative embodiments of a system 800 useful for making temperature measurements distributed over a distance and useful in a method for producing a mineral hydrocarbon fluid, according to the present disclosure. In various illustrative embodiments, the system 800 for making temperature measurements distributed over a distance may comprise a downhole tool 830 having a distributed sensing system (DSS) sensor 840 disposed in a casing 825 in a borehole 810 associated with a subterranean formation 820 having a zone 880 having mineral hydrocarbon fluids associated therewith. The DSS sensor 840 may comprise the DTS system 100 and/or the DTS/DPS system 700. The downhole tool 830 may be used to measure temperatures and/or temperatures along with pressures in the borehole 810 behind a drill bit 850. The system 800 may further comprise the drill bit 850 and a surface drilling facility 860 disposed on a surface 870. The system 800 may be used to produce at least a portion of mineral hydrocarbon fluids from the zone 880.

In accordance with the present disclosure, a system 100, 700, 800 and a method are disclosed that are useful for making temperature measurements distributed over a distance. In one aspect, the system 100, 700, 800 comprises a plurality of Bragg grating measurement points 120 disposed in an optical fiber 130 with a predetermined spacing $S_g$ between adjacent Bragg grating measurement points 120. In various illustrative embodiments, the predetermined spacing $S_g$ between adjacent Bragg grating measurement points 120 may be in a range of about 1 cm to about 10 cm. The system 100, 700, 800 may also comprise a substrate 105 having a hollow tube portion 110, 720 with the optical fiber 130 disposed thereon, the optical fiber 130 helically wrapped around the hollow tube portion 110, 720 with at least one predetermined wrap angle $\theta_1$ and/or $\theta_2$, the substrate 105 having a first coefficient of thermal expansion greater than a second coefficient of thermal expansion of the optical fiber 130.

In various aspects, the system 100, 700, 800 further comprises one or more of the following: (1) a first number N of Bragg grating measurement points 120 of the plurality of Bragg grating measurement points 120 being substantially greater than about 10, or a second number of Bragg grating measurement points in a wave-division multiplexing (WDM) Bragg grating system, (2) the substrate having a first diameter substantially less than a second diameter of a well bore, (3) a first density (such as the number per turn n) of Bragg grating measurement points 120 of the plurality of Bragg grating measurement points 120 along the optical fiber 130 being substantially greater than a second density of Bragg grating measurement points along a wave-division multiplexing (WDM) Bragg grating system optical fiber, (4) the plurality of Bragg grating measurement points 120 disposed in the optical fiber 130 disposed on the substrate 105 having a substantially faster response than about an hour, or a Raman distributed temperature sensing (DTS) system, and/or (5) the plurality of Bragg grating measurement points 120 disposed in the optical fiber 130 disposed on the substrate 105 having a substantially higher spatial resolution than about a meter, or a Raman distributed temperature sensing (DTS) system.

In various aspects, the system 100, 700, 800 further comprises the substrate 105 having a solid rod portion 730 with the optical fiber 130 disposed thereon, the solid rod portion 730 being sensitive to pressure changes and/or the substrate 105 having the hollow tube portion 110, 720 alternating with the solid rod portion 730, the system 100, 700, 800 providing temperature measurements and pressure measurements distributed over the distance. In various aspects, the system 100, 700, 800 further comprises the substrate 105 comprising a leucite ceramic. In various aspects, the system 100, 700, 800 further comprises a diameter 710 of the hollow tube portion 110, 720 being in a range from about 0.025 cm to about 2.5 cm. In various aspects, the system 100, 700, 800 further comprises the predetermined wrap angle $\theta_1$ being less than about 90 degrees measured from the circumference C (line 150) of the hollow tube portion 110, 720.

In another aspect, a system 100, 700, 800 for making temperature measurements distributed over a distance comprises a plurality of Bragg grating measurement points 120 disposed in an optical fiber 130 with a predetermined spacing $S_g$ between adjacent Bragg grating measurement points 120, a number N of Bragg grating measurement points 120 of the plurality of Bragg grating measurement points 120 being at least about 50. The system 100, 700, 800 also comprises a substrate 105 having a hollow tube portion 110, 720 with the optical fiber 130 disposed thereon, the optical fiber 130 helically wrapped around the hollow tube portion 110, 720 with at least one predetermined wrap angle $\theta_1$ less than about 90 degrees measured from the circumference C (line 150) of the hollow tube portion 110, 720, the substrate 105 having a first coefficient of thermal expansion greater than a second coefficient of thermal expansion of the optical fiber 130.

In yet another aspect, a method for making temperature measurements distributed over a distance is provided, the method comprising disposing a plurality of Bragg grating measurement points 120 in an optical fiber 130 with a predetermined spacing $S_g$ between adjacent Bragg grating measurement points 120. The method also comprises wrapping the optical fiber 130 helically around a hollow tube portion 110, 720 of a substrate 105 with at least one predetermined wrap angle $\theta_1$ and/or $\theta_2$, the substrate 105 having a first coefficient of thermal expansion greater than a second coefficient of thermal expansion of the optical fiber 130.

In various aspects, the method further comprises producing at least a portion of mineral hydrocarbon fluids, from a zone 880 having the mineral hydrocarbon fluids associated therewith, using a downhole tool 830 comprising the plurality of Bragg grating measurement points 120 in the optical fiber 130 helically wrapped around the hollow tube portion 110, 720 of the substrate 105. The plurality of Bragg grating measurement points 120 in the optical fiber 130 helically wrapped around the hollow tube portion 110, 720 of the substrate 105 are disposed in the downhole tool 830 disposed in a borehole 810 associated with a subterranean formation 820 having the zone 880 having the mineral hydrocarbon fluids associated therewith.

In accordance with the present disclosure, a device, a system, and a method useful for making temperature measurements distributed over a distance are disclosed. In various aspects, a device in accordance with the present disclosure may comprise means for making temperature measurements distributed over a distance and means for enabling the means for making temperature measurements distributed over a distance, both the means for making temperature measurements distributed over a distance and the means for enabling the means for making temperature measurements distributed over a distance covering corresponding structures and/or materials described herein and equivalents thereof.

In various other aspects, a system in accordance with the present disclosure may comprise means for making temperature measurements distributed over a distance, means for enabling the means for making temperature measurements distributed over a distance, and means for using the means for making temperature measurements distributed over a distance, all of the means for making temperature measurements distributed over a distance, the means for enabling the means for making temperature measurements distributed over a distance, and the means for using the means for making temperature measurements distributed over a distance covering corresponding structures and/or materials described herein and equivalents thereof. In yet various other aspects, a method in accordance with the present disclosure may comprise steps for making temperature measurements distributed over a distance and steps for enabling the steps for making temperature measurements distributed over a distance, both the steps for making temperature measurements distributed over a distance and the steps for enabling the steps for making temperature measurements distributed over a distance covering corresponding acts described herein and equivalents thereof.

Illustrative embodiments of the present claimed subject matter have been described in detail. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

The subject matter of the present disclosure is described with specificity. However, the description itself is not intended to limit the scope of the claimed subject matter. The claimed subject matter, thus, might also be embodied in other ways to include different steps or combinations of steps similar to the ones described herein, in conjunction with other present or future technologies. Moreover, although the term "step" may be used herein to connote different methods employed, the term should not be interpreted as implying any particular order among or between various steps herein disclosed except when the order of individual steps is explicitly described.

The particular embodiments disclosed above are illustrative only, as the present claimed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present claimed subject matter. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

The invention claimed is:

1. A system for making temperature and pressure measurements distributed over a distance, the system comprising:
   a plurality of Bragg grating measurement points disposed in an optical fiber with a predetermined spacing between adjacent Bragg grating measurement points; and
   a substrate with the optical fiber disposed thereon, at least a portion of the optical fiber being wrapped around the substrate with at least one predetermined wrap angle, wherein the predetermined wrap angle and predetermined spacing are selected to enable a temperature measurement signal to be distinguished from a bending measurement signal;
   means for receiving reflected light signals from the optical fiber and interpreting said signals so as to calculate a bending measurement and a temperature measurement;
   wherein the substrate has a first coefficient of thermal expansion greater than a second coefficient of thermal expansion of the optical fiber; and
   wherein the substrate comprises a hollow tube portion and a solid rod portion, each having optical fiber disposed thereon.

2. The system of claim 1 wherein the substrate has a first diameter substantially less than a second diameter of a well bore.

3. The system of claim 1 wherein the plurality of Bragg grating measurement points disposed in the optical fiber disposed on the substrate has a response time less than about 10 minutes.

4. The system of claim 1 wherein the plurality of Bragg grating measurement points disposed in the optical fiber disposed on the substrate has a spatial resolution better than about 50 centimeters.

5. The system of claim 1, wherein the substrate comprises a leucite ceramic.

6. The system of claim 1, wherein the first diameter of the substrate is in a range of from about 0.025 cm to about 2.5 cm.

7. The system of claim 1, wherein the predetermined wrap angle is less than about 90 degrees measured from the circumference of the substrate.

8. The system of claim 1 wherein the substrate comprises a plurality of hollow tube portions and a plurality of solid rod portions, each having a portion of the optical fiber disposed thereon.

9. A system for making temperature and pressure measurements distributed over a distance, the system comprising:
   a plurality of Bragg grating measurement points disposed in an optical fiber with a predetermined spacing between adjacent Bragg grating measurement points, a number of Bragg grating measurement points of the plurality of Bragg grating measurement points being at least about 50;
   a substrate comprising a hollow tube portion and a solid rod portion, each portion having a portion of the optical fiber disposed thereon, the optical fiber helically wrapped around the hollow tube portion with at least one predetermined wrap angle less than about 90 degrees measured from the circumference of the hollow tube portion, wherein the at least one predetermined wrap angle and the predetermined spacing are selected to allow a temperature measurement signal to be distinguished from a bending measurement signal, the substrate having a first coefficient of thermal expansion greater than a second coefficient of thermal expansion of the optical fiber; and
   detectomg light signals reflected from the optical fiber and interpreting said signals so as to calculate a bending measurement and a temperature measurement.

10. The system of claim 9 wherein the hollow tube portion has a first diameter substantially less than a diameter of a well bore.

11. The system of claim 9 wherein the substrate further includes a plurality of solid rod portions with the optical fiber disposed thereon, the solid rod portions being sensitive to pressure changes, a plurality of hollow tube portions of the substrate alternating with the solid rod portions, such that the system provides multiple temperature measurements and pressure measurements.

12. The system of claim 9 wherein the substrate comprises a leucite ceramic.

13. The system of claim 9, wherein the first diameter of the hollow tube portion is in a range of from about 0.025 cm to about 2.5 cm.

14. A method for making temperature measurements distributed over a distance, the method comprising:
  disposing a plurality of Bragg grating measurement points in an optical fiber with a predetermined spacing between adjacent Bragg grating measurement points;
  wrapping the optical fiber helically around a substrate with at least one predetermined wrap angle, the at least one predetermined wrap angle and the predetermined spacing being selected to allow a temperature measurement signal to be distinguished from a bending measurement signal, the substrate having a first coefficient of thermal expansion greater than a second coefficient of thermal expansion of the optical fiber, and the substrate comprising a hollow tube portion and a solid rod portion, each portion having a portion of the optical fiber disposed thereon;
  detecting light signals reflected from the optical fiber and interpreting said signals so as to calculate a bending measurement and a temperature measurement.

15. The method of claim 14, further including disposing the plurality of Bragg grating measurement points in the optical fiber helically wrapped around the substrate in a borehole in a subterranean formation having a zone containing mineral hydrocarbon fluids, using the Bragg grating measurement points to measure at least one of temperature and pressure in the borehole, and producing at least a portion of the mineral hydrocarbon fluids.

16. The method of claim 14 wherein the hollow tube portion has a first diameter substantially less than a diameter of a well bore.

17. The method of claim 14 wherein a plurality of hollow tube portions of the substrate alternate with a plurality of solid rod portions, such that the system provides multiple temperature measurements and pressure measurements.

18. The method of claim 14 wherein the substrate comprises a leucite ceramic.

19. The method of claim 14 wherein the first diameter of the hollow tube portion is in a range of from about 0.025 cm to about 2.5 cm.

20. The method of claim 14 wherein the plurality of Bragg grating measurement points disposed in the optical fiber has a spatial resolution better than about 50 centimeters.

* * * * *